Oct. 27, 1953

R. S. LANGDON 2,656,905

FLUID OPERATED FRICTION CLUTCH

Original Filed Aug. 13, 1945

INVENTOR
R. S. Langdon
BY
atty.

Patented Oct. 27, 1953

2,656,905

UNITED STATES PATENT OFFICE 2,656,905

FLUID OPERATED FRICTION CLUTCH

Robert S. Langdon, Seattle, Wash., assignor to Western Gear Works, Seattle, Wash., a corporation of Washington Original application August 13, 1945, Serial No. 610,465. Divided and this application August 1, 1950, Serial No. 177,013

3 Claims. (Cl. 192—85)

This invention relates to a fluid operated friction clutch and is a division of my co-pending application, Ser. No. 610,465, filed August 13, 1945, maturing October 31, 1950, as United States Patent No. 2,528,314.

The clutch of the present invention is particularly adapted for use in conjunction with a hydraulic torque converter applied to work which subjects the converter to rapidly fluctuating loads, and more especially for use as part of a power-transmitting mechanism which, under load conditions allows instant shifting from a direct-drive to a reduction-drive permitting an immediate pick-up in the converter output and thus raising the speed into the range of high converter output efficiency. The clutch is engineered to create in effect a flywheel, and this is accomplished by causing all of the elements of the clutch, except the friction plate, to rotate in unison with the turbine side of the torque converter, and by making the clutch of unusually heavy construction. The plate is operatively associated with the output shaft so as to effect a direct-drive when the clutch is engaged.

Accordingly, it is an important object of this invention to provide a friction clutch in which all of the parts except the friction plate rotate together at all times.

As a further object still, the invention aims to provide a clutch the inherent design of which permits the clutch components to be given usually heavy construction and which, working in conjunction with the unitary movement of these components, allows the clutch to effectively store energy and function as a flywheel.

A yet further object of the invention is to provide a clutch of this nature which is made to operate by fluid pressure and which can be engaged and disengaged instantaneously.

Still a further object is to provide such a clutch which is of simple and economical construction.

With the foregoing and other still more particular objects and advantages in view, the invention consists in the novel construction and in the adaptation and combination of parts hereinafter described and claimed.

Figure 1:
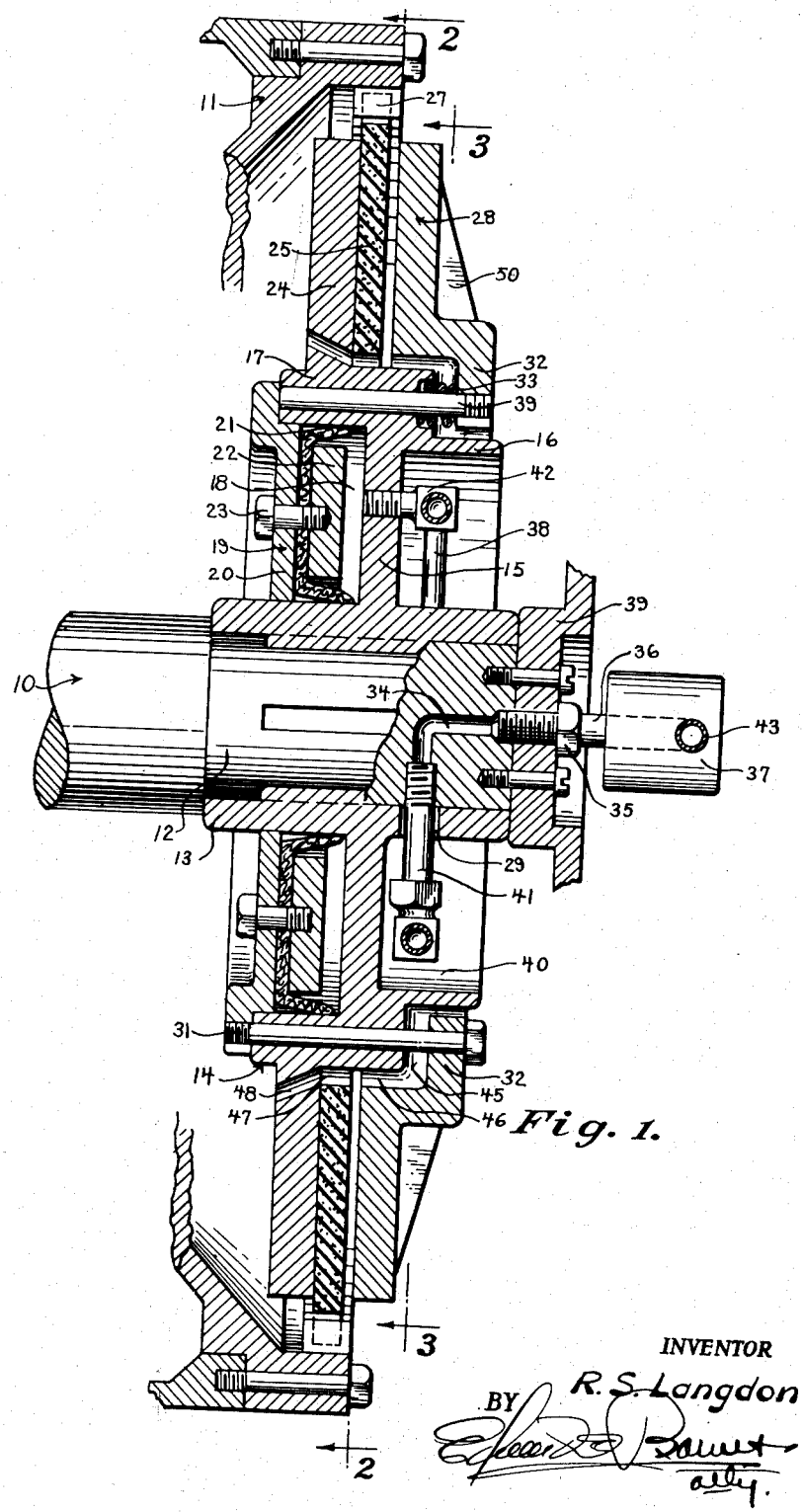
Figure 1 is a fragmentary longitudinal vertical sectional view illustrating a clutch constructed in accordance with the preferred embodiment of the present invention.
Figure 2:
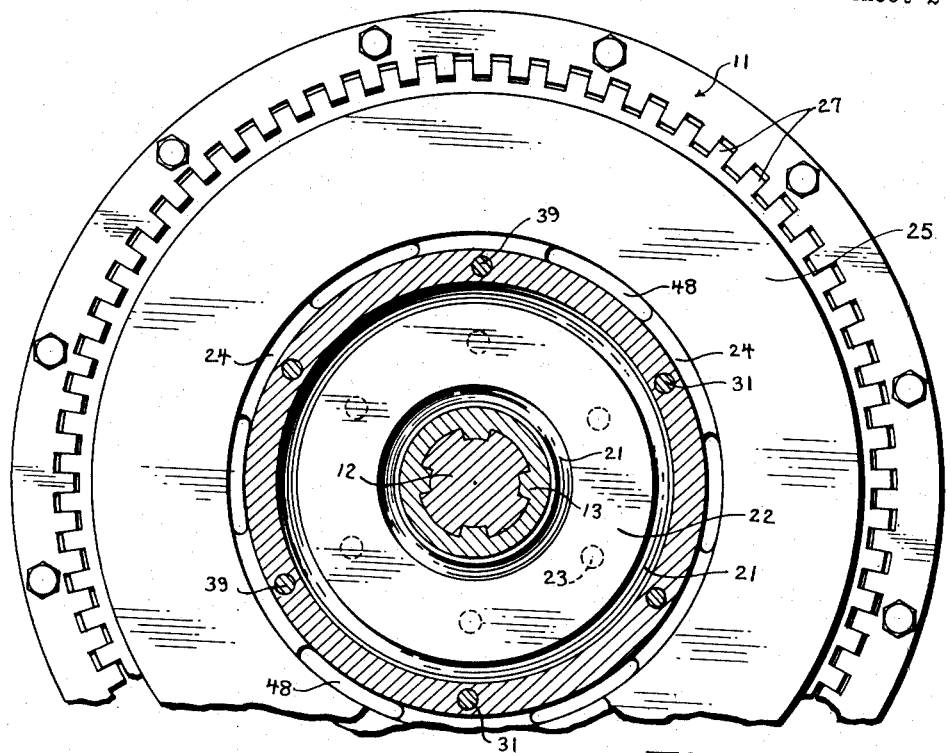
Fig. 2 is a fragmentary transverse vertical section drawn on line 2—2 of Fig. 1.
Figure 3:
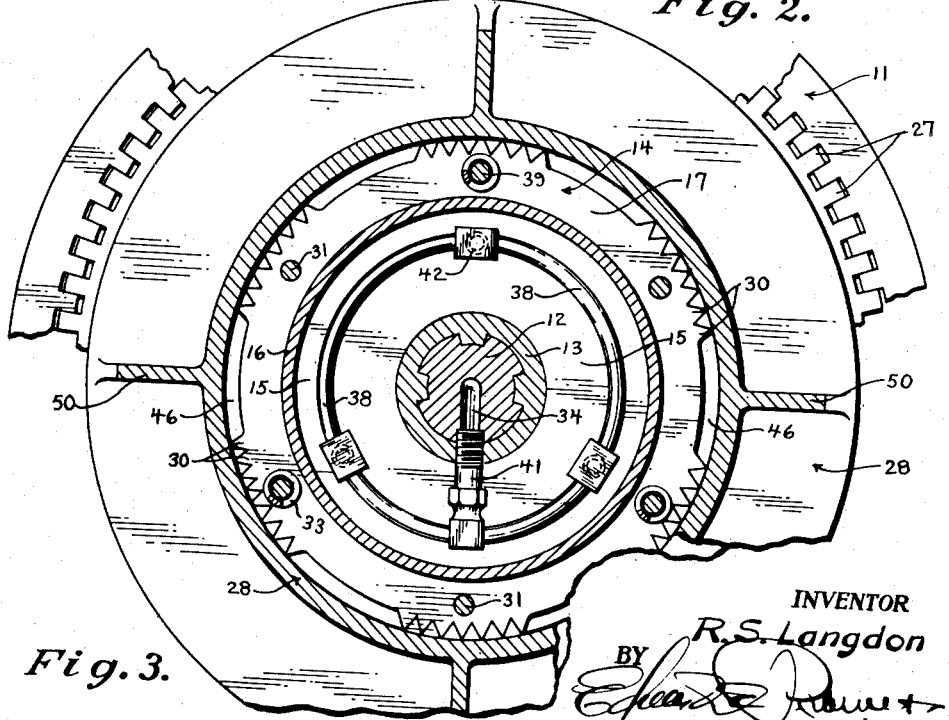
Fig. 3 is a fragmentary transverse vertical section drawn on line 3—3 of Fig. 1.

Referring to said drawings, the numeral 10 denotes the input shaft which is or may be driven by a torque converter as illustrated and described in my copending application above identified. As detailed in said application, the numeral 11 identifies a housing which is operatively associated with a hollow output shaft in such a manner that when the housing is locked to the input shaft 10 through the clutch of the present invention a direct drive is affected, and when the clutch is inactivated a reduction-drive is affected through the actuating of a brake and suitable reduction gears.

The input shaft 10 is formed with a step-down portion 12 at its outer end, and splined to this step-down portion is the hub 13 of a master wheel 14. Disposed more or less central to the length of the hub and made integral therewith the said wheel presents an outwardly extending web section 15 giving support to felly-like annular flanges 16 and 17 which are radially offset from one another and extend the former forwardly and the latter rearwardly from the web's outer limit. The hub, the rear face of the web 15, and the rearwardly directed flange 17, define an annular cavity 18 open to the rear and functioning as a cylinder. A piston 19 is slidably mounted upon the hub and presents a reduced nose portion 20 which finds a mating fit in the outer end of the cylinder. A doughnut-shaped leather 21 of U-shaped cross-section is received in the cylinder and is held between the piston and a piston follower 22 by circumferentially spaced bolts 23.

Projecting outwardly beyond the flange 17 and axially offset from the web 15 the master wheel presents a rimming plate 24 constituting and hereinafter termed a clutch principal. 25 denotes a complementary clutch friction plate disposed to the front of said principal, such plate being held by splines 27 for unitary rotation with the surrounding housing 11. A clutch plate 28 is splined, as at 30, for endwise sliding movement upon the flange 17 of the master wheel and serves as the complement of the clutch principal 24 for gripping the friction plate therebetween. The piston 19 is caused to turn in unison both with the master wheel and the clutch plate 28, by spaced cap-screws 31 threadably secured to the piston and slidably received through the flange 17 with their head ends passing through an inturned annular lip 32 formed integrally with the said clutch plate, the heads of the cap screws bearing against the outer face of said lip.

Spacer pins 39 are placed to occur at circumferentially spaced intervals alternating with the cap-screws 31 and are slidably received through the flange 17, one end of the pins being threaded to the lip 32 and the other end bearing against the outer rim of the piston 19. Clutch-release springs 33 are caught between the lip 32 and the master wheel in surrounding relation to the spacer pins. Accordingly, it will be seen that the clutch plate 28 and the piston are tied for unitary axial movement in both axial directions relative to the master wheel, such movement when directed rearwardly being yieldingly resisted by the springs 33. Since the master wheel, the clutch plate, and the piston rotate as one, they serve the function of a flywheel.

The forward end of the step-down 12 is provided with an angular bore 34 extending from its forward end axially inwardly for a short distance and then radially to connect with a registering opening 29 in the hub. The forward end of the bore 34 receives a hollow cap-screw fitting 35 having an outer integral prolongation 36 which rotatively fits in a stationary seal 37. Shown in the drawing is the hub section 39 of a sheave which drives an air compressor (not shown). The forward end of the hub 13, the web 15, and the forwardly directed flange 16 define an annular pocket 40 surrounding the hub, and accommodated in this pocket is a ring-shaped manifold 38. This manifold is joined to the transverse portion of the bore 34 by a hollow fitting 41 and is held in position by hollow spinal nipples 42 which traverse the web and feed to the interior of the cylinder 18. The seal 37 connects by a tube 43 to a pressure source of air or other fluid which is or may be supplied by the compressor and by a suitable control valve (not shown).

Tracing the operation, when a direct-drive is desired the control valve is set to admit air under pressure into the tube 43 and thence to the cylinder through the connections 37—35—41—38—42. Such pressure forces the piston rearwardly so that the cap-screws 31 are caused to draw the movable clutch plate 28 toward the clutch principal 24 and thus grip the friction plate 26 therebetween, resulting in a coupling of the movable housing 11 to the flywheel and, hence, to the input shaft 10. This effects a direct-drive to the output shaft which is secured to the said housing as aforesaid. Such movement of the clutch plate also results in a compression of the release springs 33 so that when it is desired to disengage the clutch by dumping air from the cylinder the release springs will responsively exert their constrained force and move the clutch plates apart. The dumping action is one in which the air under pressure retraces the feed path to the control valve and there discharges to the atmosphere.

A feature of the invention is the provision of a passageway through the clutch for the flow of cooling air from the front to the back of the latter. At the front side of the clutch this passageway is substantially annular in shape, being described between the master wheel and the clutch plate 28, and is accomplished by separating these members to produce a rather wide gap, designated by 45, therebetween. At the rear side of the clutch, the passageway is broken down into a plurality of arcuate slits 48 cut directly through the clutch principal 24 at the substantial root end thereof. The friction plate 25, like the plate 28, is separated from the neck of the master wheel which it surrounds to define an annular gap 47 therebetween which registers with the slits 48, and communication from this gap 47 to the gap 45 through that portion of the clutch plate which is splined to the master wheel is accomplished by mutilating the spline at circumferentially spaced intervals to produce arcuate slits 46 spaced in registering correspondence with the slits 48.

The outer portion of the clutch plate 28 is equipped with a plurality of triangular vanes 50 which serve to circulate the air adjacent the clutch. Air so circulated passes through said interior passageway as the clutch spins, and a portion of the air column also works outwardly from the passageway along the faces of the friction plate when the latter is disengaged. It will be understood that the clutch is contained in a housing having air-ingress and air-egress openings. Such housing is deleted from the present drawings but is illustrated in the above-identified patent of which this application is a division.

The invention should be clear from the foregoing detailed description, but it is to be understood that changes may be made without departing from the inventive concept and I therefore intend that the hereto annexed claims be given a scope fully commensurate with the broadest interpretation which the employed language fairly permits.

What I claim is:

1. A fluid-operated clutch for use in coupling driving and driven members journal-mounted for rotary movement about a coinciding axis, a master wheel coupled for unitary movement with the driving member, said master wheel being formed with an annular open-end cylinder for receiving the fluid medium, said cylinder being placed concentric to the axis of rotation and presenting an integral clutch principal having its working face directed opposite from the open end of the cylinder, a piston received in said cylinder, a clutch plate facing the clutch principal, a friction plate coupled for unitary rotary movement to the driven member and occupying a position between the clutch principal and clutch plate, said clutch plate and piston occupying positions at opposite sides of the master wheel, tie-bolts journaled for endwise sliding movement in the master wheel and connecting the clutch plate and the piston, spacing pins slidably received through the master wheel with one end thereof secured to the clutch plate, and springs carried by said pins and arranged to yieldingly resist inward movement of the clutch plate toward the clutch principal.

2. In a fluid-operated clutch for use in coupling driving and driven members journal-mounted for rotary movement about a coinciding axis, a master wheel coupled for unitary movement with the driving member, said master wheel being formed with an annular open-end cylinder for receiving the fluid medium placed concentric to the axis of rotation and presenting an integral clutch principal having its working face directed opposite from the open end of the cylinder, a piston received in said cylinder, a clutch plate facing the clutch principal and carrier by the master wheel for axial movement with respect thereto, said piston and clutch plate presenting opposed annular flanges positioned on opposite sides of the master wheel, tie bolts slidably received through the master wheel and connecting said opposed annular flanges, a friction plate coupled for unitary movement to the driven member and occupying a position between the clutch principal and clutch plate, and means yieldingly resisting outward movement of the piston.

3. In a fluid-operated clutch for use in coupling driving and driven members journal-mounted for rotary movement about a coinciding axis, a master wheel coupled for unitary movement with the driving member, said master wheel being formed with an annular open-end cylinder for receiving the fluid medium placed concentric to the axis of rotation and presenting an integral clutch principal having its working face directed opposite from the open end of the cylinder, a piston received in said cylinder, a clutch plate facing the clutch principal and carried by the master wheel for axial movement with respect thereto, said piston and friction plate presenting opposed annular flanges positioned on opposite sides of the master wheel, tie bolts slidably received through the master wheel and connecting said opposed annular flanges, spacing pins slidably received by the master wheel with one end thereof secured to the annular flange of the clutch plate, compression springs carried by said pins and positioned between the annular flange of the clutch plate and the master wheel to yieldingly resist inward movement of the clutch plate toward the clutch principal, and a friction plate coupled for unitary rotary movement to the driven member and occupying a position between the clutch principal and clutch plate.

ROBERT S. LANGDON.

References Cited in the file of this patent

UNITED STATES PATENTS

| Number | Name | Date |
|---|---|---|
| 715,111 | Miller | Dec. 2, 1902 |
| 1,759,755 | Lindner | May 20, 1930 |
| 2,176,468 | Noun et al. | Oct. 17, 1939 |
| 2,291,241 | Laurence | July 28, 1942 |
| 2,317,599 | Freer | Apr. 27, 1943 |
| 2,354,385 | Lambert | July 25, 1944 |
| 2,376,685 | Goepfrick | May 22, 1945 |
| 2,437,670 | Adamson | Mar. 16, 1948 |